C. C. KEESLER.
MOTOR VEHICLE.
APPLICATION FILED APR. 26, 1917.

1,350,460.

Patented Aug. 24, 1920.
4 SHEETS—SHEET 1.

Inventor:
Clyde C. Keesler
By Parsons & Biddell
Attorneys.

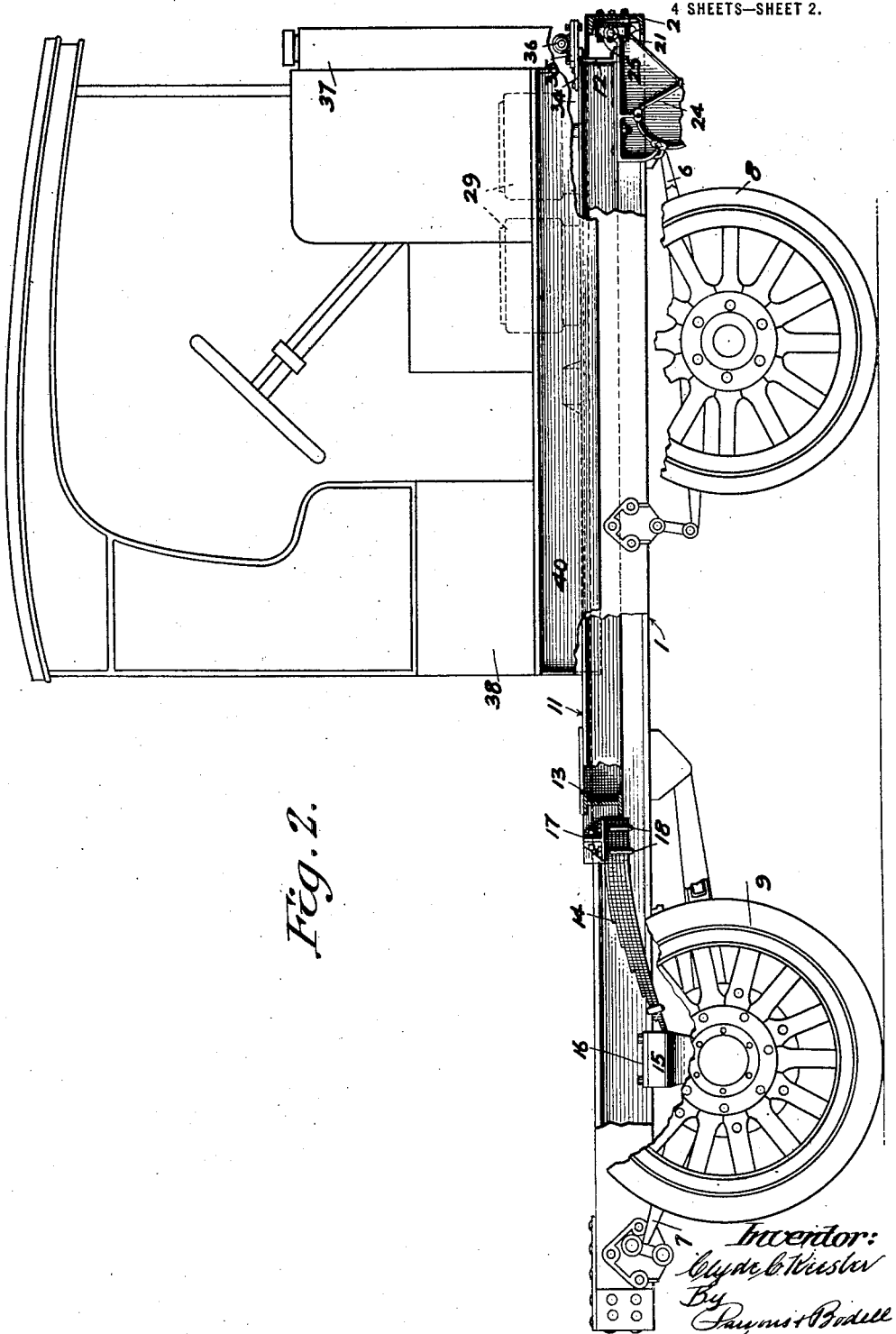

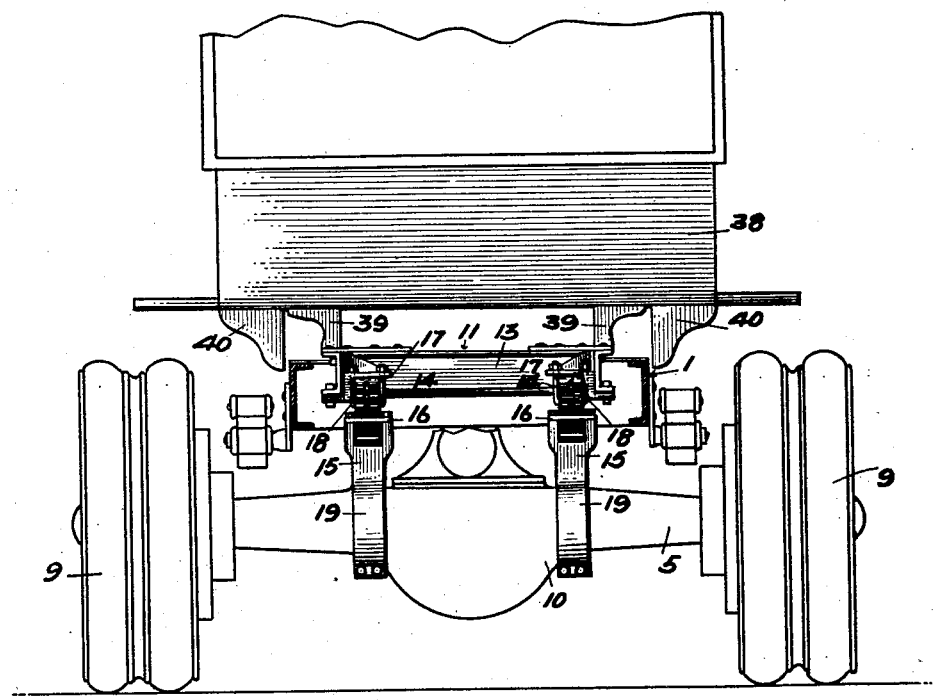
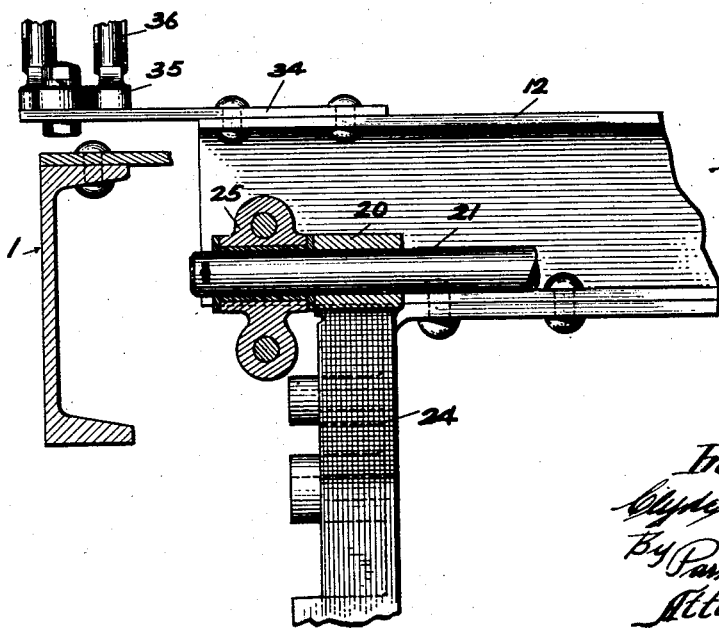

C. C. KEESLER.
MOTOR VEHICLE.
APPLICATION FILED APR. 26, 1917.
1,350,460.  Patented Aug. 24, 1920.
4 SHEETS—SHEET 4.
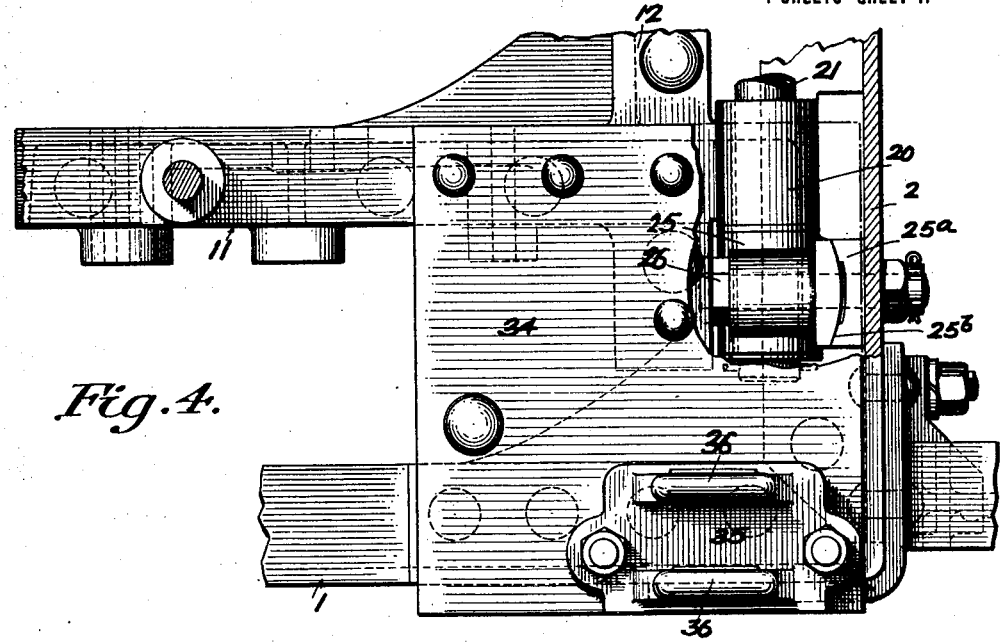
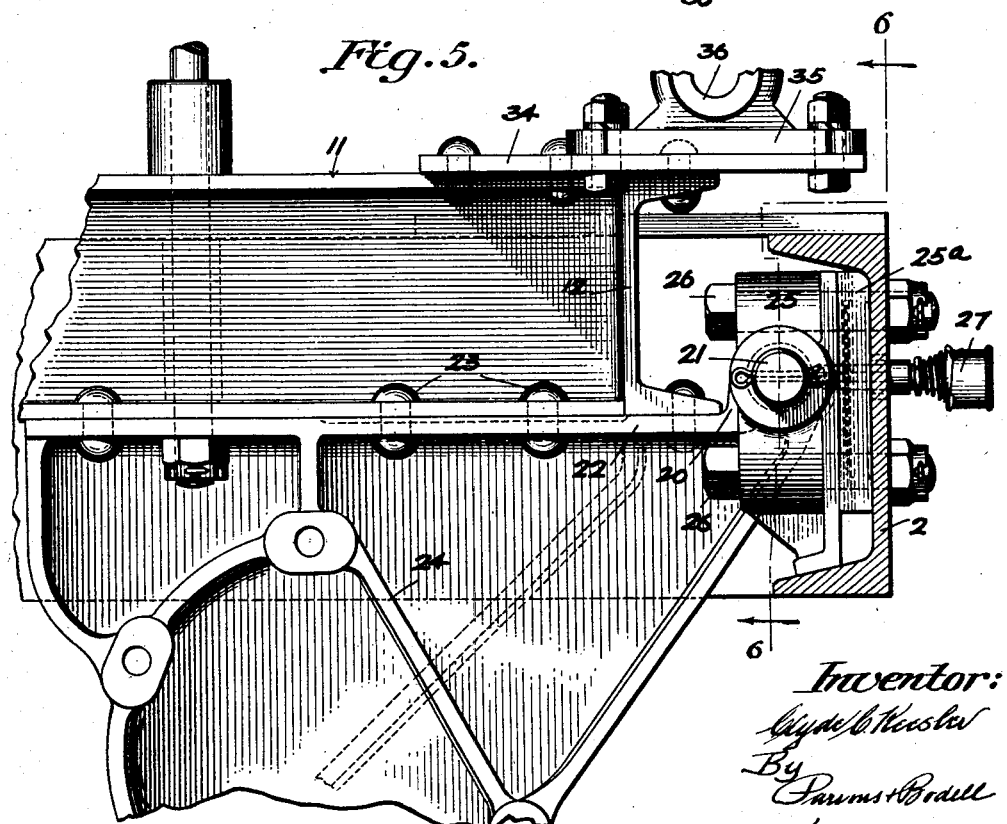
Inventor:
Clyde C. Keesler
By Parums & Bodell
Attorneys.

UNITED STATES PATENT OFFICE.

CLYDE C. KEESLER, OF CANASTOTA, NEW YORK, ASSIGNOR TO WATSON WAGON COMPANY, OF CANASTOTA, NEW YORK, A CORPORATION OF NEW YORK.

MOTOR-VEHICLE.

1,350,460.

Specification of Letters Patent. Patented Aug. 24, 1920.

Application filed April 26, 1917. Serial No. 104,659.

*To all whom it may concern:*

Be it known that I, CLYDE C. KEESLER, a citizen of the United States, and a resident of Canastota, in the county of Madison and State of New York, have invented a certain new and useful Motor-Vehicle, of which the following is a specification.

This invention relates to motor vehicles and has for its object a particularly simple and efficient construction especially applicable for trucks, by which construction the main frame and main load is carried by the main frame and supported by the comparatively stiff springs thereof, and the power plant and related parts are carried by a sub-frame supported by weaker springs so that the power plant and related parts are relieved of the heavy shocks and jars of the main load. The invention consists in the novel features and in the combinations and constructions hereinafter set forth and claimed.

In describing this invention, reference is had to the accompanying drawings, in which like characters designate corresponding parts in all the views.

Fig. 2 is a side elevation of the truck, parts being removed.

Fig. 3 is a rear elevation, partly broken away, and parts being omitted, of the sub-frame and contiguous parts, the side sills of the main frame being shown in section.

Fig. 4 is an enlarged fragmentary view showing in detail one of the front corners of the main frame and sub-frame.

Fig. 5 is an elevation, partly in section, of parts seen in Fig. 4.

Fig. 6 is a sectional view, taken on the plane of line 6—6, Fig. 5.

Figure 1:
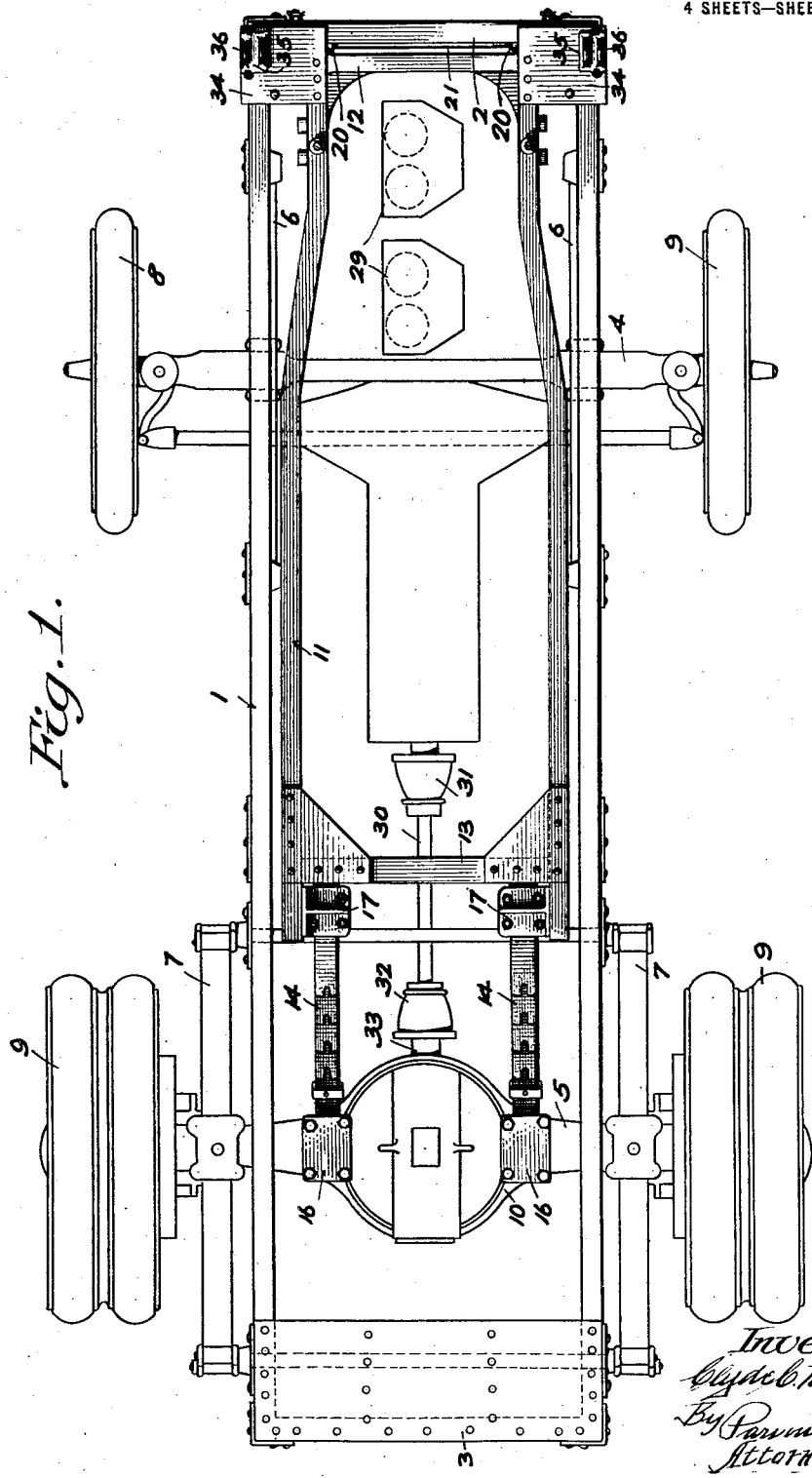
Figure 1 is a plan view of a chassis embodying my invention, the power plant being shown diagrammatically.

This truck comprises generally a main frame, main springs supporting the main frame, a sub-frame movable relatively to the main frame, additional springs supporting the sub-frame, and a power plant and related parts carried by the sub-frame.

1 designates the main frame as a whole which, as here shown, is formed of channel iron and comprises side sills and front and rear cross-bars 2, 3, suitably secured together in a rigid manner, the main frame being supported over the usual front and rear axles 4, 5 by comparatively heavy or stiff springs 6, 7 interposed between the front axle 4 and the frame, and the rear axle and the frame. The usual steering wheels 8 are mounted on the front axle or the steering knuckles connected thereto, and the drive wheels 9 are mounted on the rear axle. The rear axle is of any well-known construction and includes shaft sections upon which the wheels 9 are mounted, the differential gear connecting the shaft sections, and the casing 10 inclosing the shaft sections and the differential gear.

11 designates the sub-frame which is formed of channel iron and includes side members or sills and front and rear cross pieces 12, 13 rigidly secured to the sills, the sills lying within the side sills of the main frame 1.

In this embodiment of my invention, the sub-frame 11 is pivoted at its front end near the front end of the main frame 1, and is spring supported at its rear end. The rear end of the sub-frame is located about midway between the ends of the main frame, as this motor vehicle is adapted for a truck in which either a hopper or box is mounted on the rear portion of the main frame or in which the front end of a semitrailer is supported over the rear wheels, the features of importance being that the main load is supported by the main frame over the rear wheels and by the relatively stiff springs.

In this form of my invention, the springs supporting the sub-frame 11 are interposed between one of the axles as the rear axle and the sub-frame 11.

14 designates the springs which are here shown as quarter-elliptical leaf springs, supported at their rear ends by the rear axle, said springs 14 extending forwardly and being rigidly secured to their front ends to the rear end of the sub-frame 11. The springs 14 are slidably secured to one of the parts that connect and as here shown are slidable relatively to the rear axle 5 or the casing 10 thereof. In the illustrated form of my invention, the rear ends of these springs rest in seats 15 mounted on the axle casing 10, the springs being capable of sliding forwardly and rearwardly therein during up and down movement of the sub-frame 11. These seats or boxes are covered by plates 16 held in position in any suitable manner as by cap screws. The front ends of the springs 14 are secured to brackets 17 bolted to the inner faces of the side sills of the sub-frame, the springs being secured to the brackets by U-shaped clips 18. The seats 15 are mounted upon rings 19 suitably clamped to the rear axle casing 10.

The sub-frame 11 is provided at its front end with bearings 20 mounted upon a shaft 21 carried by the main frame as hereinafter described, the bearings 20 being provided on brackets 22 secured as by rivets 23 to the lower flanges of the channel iron of the side sills of the sub-frame 11, these brackets also including depending portions 24 for supporting parts of the steering gear connected to the steering wheel.

The shaft 21 is supported in bearings 25 carried on the inner side of the web of the front cross-bar 2 of the main frame 1, each bearing 25 being held in position by bolts 26, which clamp the same against brackets 25ᵃ located in the angle of the channel iron cross-bar. The engaging faces of the bearing 25 and bracket 25ᵃ are arc shaped as indicated at 25ᵇ to permit the bearing to aline itself with the shaft 21.

A suitable grease cup 27 extends through the front cross-bar 20 of the main frame, the bracket of the bearing 25 and into the bearing.

29 designates the engine, transmission gearing, clutch, etc., constituting the power plant, which power plant is carried by the sub-frame in any well known manner.

30 designates the shaft connected at one end to the power plant by a universal joint 31 and at its rear end by a universal joint 32, to a shaft 33 having a gear thereon meshing with the driver of the differential in the ordinary manner. The related parts of the power plant, such as the radiator, cab, driver's seat, steering mechanism, are also carried by this sub-frame.

As here shown, the sub-frame is provided with plates 34 at its front corners above its axis, the plates overhanging the front corner of the main frame 1. Brackets 35 having bearings 36 in which the lower end of the radiator 37 is supported, are mounted on said plates.

The cab 38 includes an angle-iron frame 39 mounted over the side sills of the main frame 1, and having side strips or shields 40 which together with the frame 39 form a channel for receiving the side sills of the main frame during any vertical movement of the sub-frame 11.

In operation, the heavy main load is carried by the main frame while the power plant and related parts are carried by the sub-frame, and hence are not subject to the severe shocks of the main frame. As the heavier part of a truck is carried by the rear wheels, the front end of the sub-frame is pivoted. Furthermore, as the spring supported sub-frame carries the power plant, it is subject to torque during starting of the vehicle, that is, when the main clutch takes hold, and the springs of the sub-frame act to relieve the drive shaft of some of the strain when the main clutch takes hold.

What I claim is:—

1. A motor vehicle comprising a main frame, axles, ground wheels on the axles, springs between the axles and the main frame, a sub-frame, springs located between one of the axles and a portion of the sub-frame and normally yieldingly supporting the sub-frame to permit movement of the sub-frame relatively to the main frame, the sub-frame being pivoted to the main frame at a point remote from the springs supporting said sub-frame, and a power plant and vehicle body carried by the sub-frame, substantially as and for the purpose described.

2. A motor vehicle comprising front and rear axles, a main frame, springs interposed between the axles and the main frame, a sub-frame located between the sills of the main frame and being spring supported and movable vertically relatively to the main frame, and a body supported on the sub-frame and extending laterally over the sills of the main frame, the body having lengthwise channels arranged above said sills in alinement therewith, which move downwardly over the said sills during downward movement of the sub-frame, substantially as and for the purpose specified.

3. A motor vehicle comprising front and rear axles, a main frame, springs interposed between the main frame and the axles, a sub-frame pivoted at its front end to the main frame, and being located between the side sills of the main frame and having laterally extending plates at its front end above its pivot, said plates overlying the main frame, and a power plant and related parts carried by the sub-frame including a part mounted on said plates, substantially as and for the purpose set forth.

In testimony whereof I have hereunto signed my name at Syracuse, in the county of Onondaga, and State of New York, this 18th day of April, 1917.

CLYDE C. KEESLER.